US011461465B1

(12) United States Patent
Jiang et al.

(10) Patent No.: US 11,461,465 B1
(45) Date of Patent: Oct. 4, 2022

(54) PROTECTION OF KERNEL EXTENSION IN A COMPUTER (71) Applicant: TREND MICRO INC., Tokyo (JP)

(72) Inventors: Chuan Jiang, Nanjing (CN); Xilin Li, Nanjing (CN); Yafei Zhang, Nanjing (CN)

(73) Assignee: TREND MICRO INC., Tokyo (JP)

( * ) Notice: Subject to any disclaimer, the term of this patent is extended or adjusted under 35 U.S.C. 154(b) by 0 days.

(21) Appl. No.: 17/207,197

(22) Filed: Mar. 19, 2021

Related U.S. Application Data (62) Division of application No. 16/422,550, filed on May 24, 2019, now Pat. No. 10,990,673.

(51) Int. Cl.
G06F 21/56 (2013.01)
G06F 21/52 (2013.01)

(52) U.S. Cl.
CPC ............ *G06F 21/561* (2013.01); *G06F 21/52* (2013.01); *G06F 2221/034* (2013.01)

(58) Field of Classification Search
CPC ... G06F 21/561; G06F 21/52; G06F 2221/034
USPC ......................................................... 726/24
See application file for complete search history.

(56) References Cited

U.S. PATENT DOCUMENTS 7,703,139 B2   4/2010 Grebenev
8,484,734 B1 * 7/2013 Tsai ..................... G06F 21/564
                                                        726/24
2006/0041878 A1 * 2/2006 Albot ....................... G06F 8/65
                                                        717/162
2006/0294334 A1 * 12/2006 Jann ..................... G06F 12/1027
                                                        711/170

(Continued)

FOREIGN PATENT DOCUMENTS

CN    101071387 A  * 11/2007
CN    101661381 A  *  3/2010

(Continued)

OTHER PUBLICATIONS

Tian et al., "A Kernel Rootkit Detection Approach Based on Virtualization and Machine Learning", IEEE, doi: 10.1109/ACCESS.2019.2928060, pp. 91657-91666, 2019. (Year: 2019).*

(Continued)

*Primary Examiner* — Peter C Shaw
(74) *Attorney, Agent, or Firm* — Beyer Law Group LLP (57) ABSTRACT

A method protects a daemon in an operating system of a host computer. The operating system detects that there is an access of a plist file of a daemon by a process in the computer. If so, then it executes a callback function registered for the plist file. The callback function sends to a kernel extension a notification of the attempted access. The kernel extension returns a value to the operating system indicating that the access should be denied. The operating system denies access to the plist file of the daemon by the process. The extension may also notify an application which prompts the user for instruction. The kernel extension also protects itself by executing its exit function when a command is given to unload the extension, and the exit function determines whether or not the command is invoked by an authorized application, such as by checking a flag.

6 Claims, 8 Drawing Sheets

System to Protect Anti-Virus Daemon (56) References Cited

U.S. PATENT DOCUMENTS

| | | | |
|---|---|---|---|
| 2007/0038572 A1* | 2/2007 | Pastorelli | H04L 63/10 |
| | | | 705/52 |
| 2007/0220343 A1* | 9/2007 | Harres | G06F 11/0751 |
| | | | 714/36 |
| 2010/0122313 A1 | 5/2010 | Ivgi | |
| 2012/0005445 A1* | 1/2012 | Escandell | G06F 12/023 |
| | | | 711/170 |
| 2012/0011350 A1* | 1/2012 | Peckham | G06F 9/45537 |
| | | | 713/1 |
| 2012/0011502 A1* | 1/2012 | Filali-Adib | G06F 9/45558 |
| | | | 718/1 |
| 2012/0317638 A1 | 12/2012 | Carrara et al. | |
| 2016/0371127 A1* | 12/2016 | Antony | G06F 11/0793 |
| 2017/0249174 A1* | 8/2017 | Tsirkin | G06F 21/52 |
| 2017/0255775 A1 | 9/2017 | Sorresso | |
| 2018/0336360 A1 | 11/2018 | Kolishchak | |
| 2020/0021592 A1* | 1/2020 | Jerrell | G06F 21/44 |

FOREIGN PATENT DOCUMENTS

| | | | | |
|---|---|---|---|---|
| CN | 102082969 A | * | 6/2011 | |
| CN | 103049381 A | * | 4/2013 | |
| CN | 104112098 A | * | 10/2014 | G06F 21/554 |
| WO | WO-2006026403 A2 | * | 3/2006 | G06F 11/1438 |
| WO | WO-2008115012 A1 | * | 9/2008 | G06F 21/51 |
| WO | WO-2017166447 A1 | * | 10/2017 | |

OTHER PUBLICATIONS

IPCOM, "Kernel Extension Loading Management", IP.com, IPCOM000158083D, Sep. 14, 2007, p. 1-2. (Year: 2007).*

Balde et al., "An Indirect Hotswapping System for Linux Kernel Modules", IEEE< doi: 10.1109/ICCP.2007.4352161, 2007, pp. 201-208. (Year: 2007).*

De Goyeneche et al., "Loadable kernel modules", IEEE, doi: 10.1109/52.744571, pp. 65-71, Jan.-Feb. 1999. (Year: 1999).*

Xu et al., "Detecting exploit code execution in loadable kernel modules", IEEE, doi: 10.1109/CSAC.2004.18, 2004, pp. 101-110. (Year: 2004).*

IP.com, Dedicated Processor core to detect and prevent security threats, Oct. 5, 2012, IP.com, IPCOM000222433D, pp. 1-3. (Year: 2012).

* cited by examiner

*FIG. 1*
*(PRIOR ART)*

*FIG. 2*
System to Protect Anti-Virus Daemon

FIG. 3
Security Module

FIG. 7
User Interface Example

PROTECTION OF KERNEL EXTENSION IN A COMPUTER

This application is a divisional of U.S. patent application Ser. No. 16/422,550 filed May 24, 2019, entitled "PROTECTION OF ANTIVIRUS DAEMON IN A COMPUTER," which is hereby incorporated by reference.

FIELD OF THE INVENTION

The present invention relates generally to computer security. More specifically, the present invention relates to the protection of daemons executing upon a computer, especially computer security daemons.

BACKGROUND OF THE INVENTION

As known in the art, computer security software (often referred to generally as "antivirus software") executes upon a host computer in order to protect it from malware such as viruses, key loggers, computer worms, Web threats, and other malicious software. Typically, such computer security software is loaded and begins executing automatically upon startup of the computer. On a computer running a Microsoft operating system, such security software uses an operating system service mechanism to load and protect the security software. The security software can set flags known as "canshutdown/canpauseAndcontinue" (i.e., set flags to false) in order to prevent an attacker from terminating the computer security software.

On a computer running an operating system from APPLE, INC., the operating system provides a similar mechanism to load and execute antivirus software. This mechanism is known as "launchd" and is an open source service management framework for starting, stopping and managing daemons, applications, processes and scripts. Antivirus software will use this mechanism to automatically load and run an antivirus daemon (AV daemon) in order to protect the host computer from malware.

Unfortunately, though, there is no such "canshutdown/canpauseAndcontinue" mechanism in the APPLE operating system to prevent an AV daemon from being stopped. Any unscrupulous party (or other) is able to stop or unload an AV daemon by issuing a system command, such as by invoking "launchctlstop/unload daemonID." Thus, the AV daemon can be stopped and the host computer is left without any antivirus protection from malware.

Accordingly, a system and technique are desired that would prevent an AV daemon within an operating system having no protection for that daemon from being stopped by any unknown party.

SUMMARY OF THE INVENTION

To achieve the foregoing, and in accordance with the purpose of the present invention, a technique is disclosed that allows a kernel extension to protect an antivirus daemon or any other application daemon from being stopped by an unauthorized party.

In a first embodiment, a method protects a daemon in an operating system of the host computer by allowing a kernel extension to respond immediately when access to a plist file is detected. The operating system first detects that there is an attempted access of a plist file of an executing daemon by a process executing in the host computer. If so, then it executes a callback function registered for the plist file. The callback function operates to send to a kernel extension a notification of the attempted access. The kernel extension then returns a value to the operating system indicating that the attempted access should be denied. The operating system then denies access to the plist file of the executing daemon by the process.

In a second embodiment, a method protects a daemon in an operating system of the host computer by sending a notification to user who responds with an instruction to deny access. The operating system first detects that there is an attempted access of a plist file of an executing daemon by a process executing in the host computer. If so, then it executes a callback function registered for the plist file and sends to a kernel extension a notification of the attempted access. The kernel extension notifies an application module which prompts the user via an interface. The user provides input to deny the attempted access. The kernel extension then returns a value to the operating system indicating that the attempted access should be denied. The operating system then denies access to the plist file of the executing daemon by the process.

In a third embodiment, a method protects a kernel extension of an operating system of the host computer that has previously been loaded into kernel mode by a daemon executing in the operating system. The daemon may represent an antivirus software module or any application module. The operating system receives a command to unload or to stop the kernel extension which has been invoked by a process executing in the host computer. In response to this command, the kernel extension executes a function in order to determine that command was not invoked by the daemon. Next, the kernel extension returns a value to the operating system indicating that the command should be denied, and then the operating system denies the process to unload or to stop the kernel extension from executing.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

As alluded to above, a daemon is a computer program executing in the background of an operating system that performs tasks such as daily maintenance of the computer or scanning the computer for malware and taking steps to eliminate that malware. A daemon may also be referred to as an agent, the difference being that an agent is typically run on behalf of any user while a daemon runs on behalf of a user with special privileges, such as the root user. As used herein, the term daemon will be used to encompass both daemons and agents.

System Overview

Figure 1:
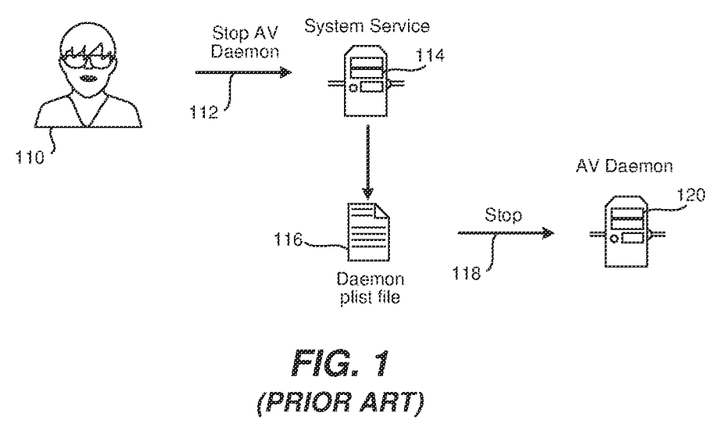
FIG. 1 is a high-level prior art diagram showing how an unscrupulous individual may stop an AV daemon from executing.

FIG. 1 is a high-level prior art diagram showing how an unscrupulous individual may stop an AV daemon from executing. As shown, an unscrupulous individual 110 may cause a command to be issued 112 to stop an AV daemon 120 from executing on a computer. Typically, the individual needs root permission (which can be obtained by some hackers) and this is a command sent to a system service 114 ("sbin/launchd" service), the command taking the form of "launchctlstop/unload daemonID in" or similar. The command accesses the daemon plist file 116 in order to stop 118 the AV daemon 120 from executing.

Figure 2:
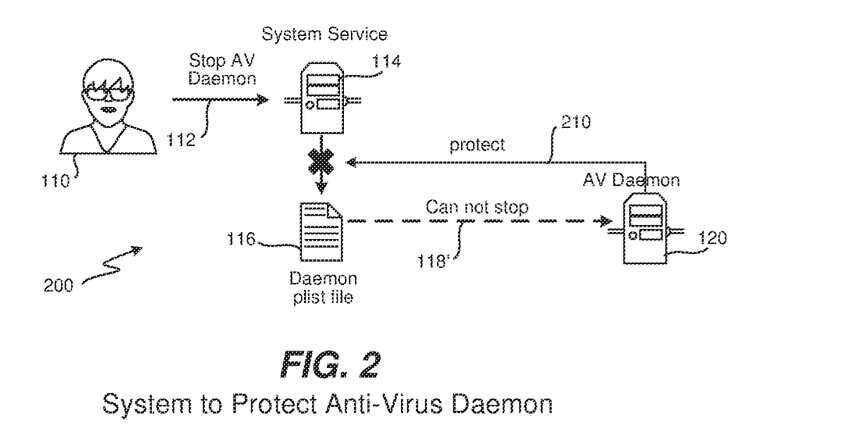
FIG. 2 illustrates a system showing how an individual is unable to stop an AV daemon from executing.

FIG. 2 illustrates a system 200 showing how an individual is unable to stop an AV daemon from executing. As shown, individual 110 may cause a command to be issued 112 to stop an AV daemon 120 from executing on a computer. Typically, this is a command sent to a system service 114, the command taking the form of "launchctlstop/unload daemonID in" or similar. The command is attempting to access the daemon plist file 116 in order to stop the AV daemon 120 from executing. As known in the art, there is a plist file for each daemon within the operating system of the computer. As explained in more detail below, AV daemon 120 loads a kernel extension which is able to hook all file accesses. When the system service 114 attempts to access plist file 116, the kernel extension detects this access and blocks this access. Thus, the issued command cannot stop 118' the AV daemon 120 from executing, and protection 210 is provided by the AV daemon to itself. Accordingly, this mechanism may be used to block any access to the daemon plist file 116 and the AV daemon cannot be stopped except by using a special technique explained in more detail below.

Figure 3:
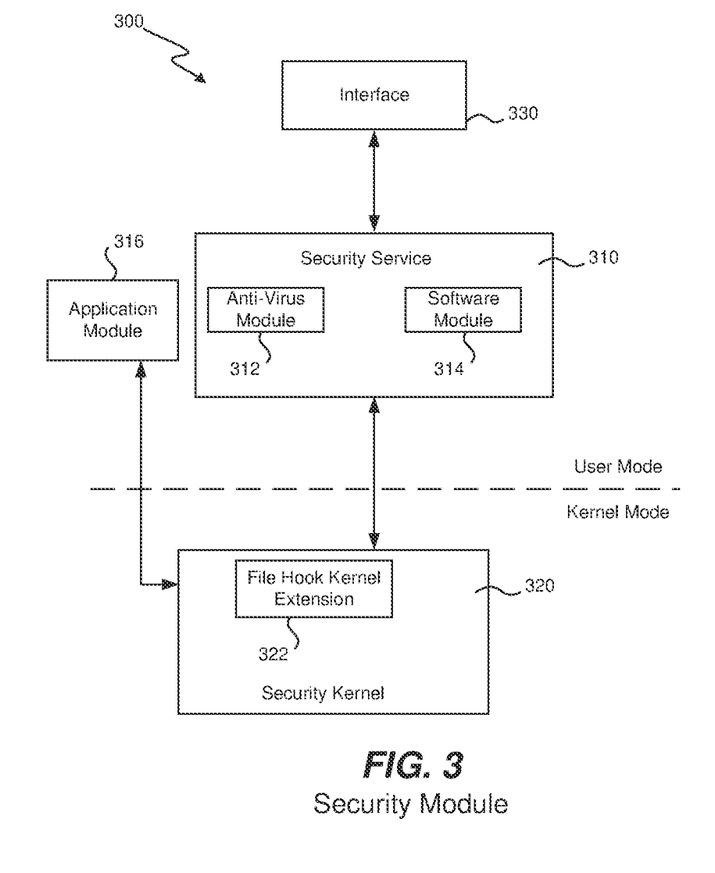
FIG. 3 is a block diagram of a security module according to one embodiment of the invention.

FIG. 3 is a block diagram of a security module 300 according to one embodiment of the invention. The security module provides various computer security services to the host computer and includes one or more sub-modules. The host computer is preferably running an operating system from APPLE INC., such as the MAC OS X operating system. As shown, the security module includes a security service 310 and a security kernel 320. Security service 310 may include any of a number of anti-malware software modules such as antivirus module 312 and software module 314 (such as Web threat protection, etc). The present invention may be used with any of such other software modules. In fact, any application module 316 (that need not be part of the security service 310) may be used with the present invention and may make use of kernel extension 322 (as described below) in order to prevent a daemon executing on behalf of application module 316 from being stopped by any unauthorized party. In one specific embodiment, security service 310 provides the functionality available in TREND MICRO ANTIVIRUS FOR MAC security software available from TREND MICRO INC.

Security kernel 320 includes a kernel extension "File Hook" 322; as will be explained in greater detail below, this kernel extension is loaded by the AV daemon and is able to hook all file accesses to a plist file and then block any unauthorized accesses to the AV daemon plist file. As shown, security service 310 operates in user mode while security kernel 320 operates in kernel mode of the operating system.

Interface 330 may be implemented as a graphical user interface or as an application programming interface to allow any user of the host computer or other application to interact with and control security service 310 in order to protect the host computer. Such control includes timing of antivirus scanning, scheduling and implementing software updates, adjusting parameters of the antivirus module, blocking particular Web sites, etc.

Flow Diagrams

Figure 4:
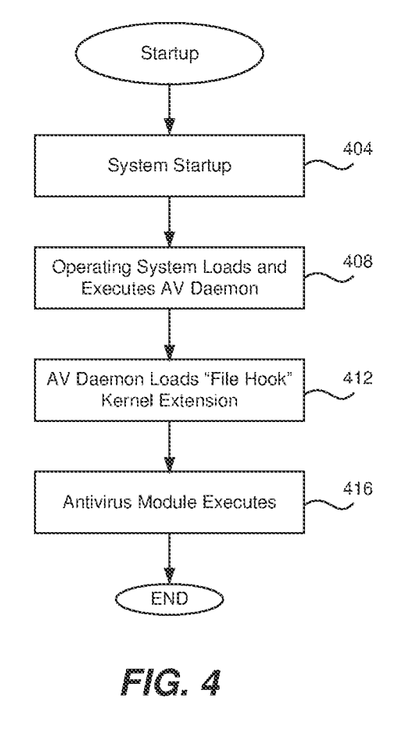
FIG. 4 is a flow diagram describing one embodiment by which a computer starts up and computer security software such as antivirus software begins executing.

FIG. 4 is a flow diagram describing one embodiment by which a computer starts up and computer security software such as antivirus software begins executing.

In a first step 404 the computer starts up, reboots, restarts or otherwise begins executing its operating system as is known in the art. As explained above, a special "launchd" process exists in operating systems developed by APPLE, INC., and upon operating system start up the launchd process automatically starts and scans the various daemon directories such as "/System/Library/Launch Daemons" and "/Library/Launch Daemons" for any job definitions and in order to load any daemons found. Similarly, when a user logs in a new "launchd" process will be started for this user and this process will scan any agent directories (similar to the directories above) for job definitions and will also load any daemons found. Typically, a job definition for a daemon (such as an AV daemon) will have a job definition of "RunAtLoad" (or perhaps, "KeepAlive") which will automatically began execution of the daemon once it is loaded.

Accordingly, in step 408 the operating system begins execution, loads AV daemon 120, and begins execution of the AV daemon which provides the aforementioned computer security software for the host computer. More specifically, as there is plist file for each daemon (typically found under "/System/Library/Launch Daemons"), the operating system is able to access these various plist files in order to load the appropriate daemon upon startup. Similarly, any entity may also access the plist file of the daemon in order to stop it or to unload it. Thus, the operating system accesses plist file 116 for the AV daemon 120 in order to load the AV daemon and begin its execution.

Next in step 412, the AV daemon loads the kernel extension File Hook. File Hook 322 may be implemented using the kernel authorization (KAUTH) kernel subsystem of the MAC OS X operating system and registers with the operating system in order to hook any file operations involving the plist file 116. In one specific embodiment, File Hook 322 registers a callback "kauth_scope_callback" with the operating system. As will be described in more detail below, when an attempt is made to access plist file 116 the operating system will execute the registered callback in order to notify File Hook 322 of the access and then the File Hook can take action. Specifically, the callback "kauth_scope_callback" is not only for the AV daemon plist file, but provides a notification for all files in the system, i.e., when any file is modified. The callback function filters all notifications to find an attempted modification of the plist file and thus monitors when it is accessed. Next, in step 416 the antivirus module begins (or continues) execution via the AV daemon and provides protection for the host computer against malware as has been described above.

Figure 5:
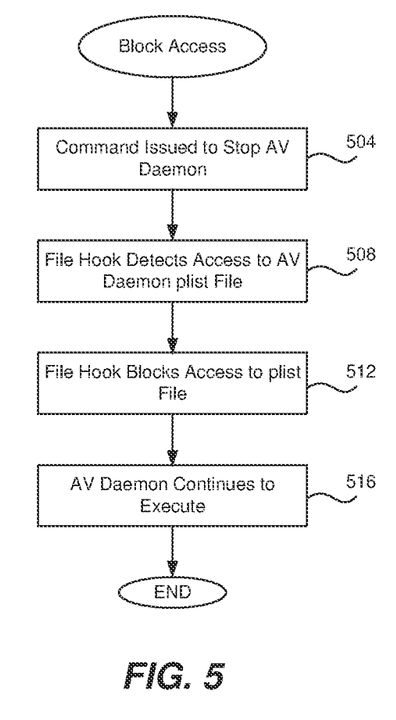
FIG. 5 is a flow diagram describing one embodiment by which an attempt to stop the antivirus module from executing is blocked.

FIG. 5 is a flow diagram describing one embodiment by which an attempt to stop the antivirus module from executing is blocked. As discussed immediately above, the AV daemon is now executing and providing protection to the host computer. At some point in time, in step 504, an attacker (an individual or malicious software process) may attempt to stop the antivirus module from executing by sending a command to unload the AV daemon. Typically, this is done by attempting to access the AV daemon's plist file in order to stop it or to unload it. In particular, an attacker (often with root permission) will invoke the command "launchctl stop/unload daemonID", providing the identifier for the AV daemon, and an option to stop or unload the AV daemon. Other possible commands that an attacker might give in an attempt to access the AV daemon's plist file can also be detected and blocked. An attacker may also attempt to modify this plist file by opening/reading/writing the file as a normal file, although only the "launchctl" command is used to stop the AV daemon. This embodiment of the invention will also block all accessing (open/read/write) of this plist file, thus it cannot be modified by an attacker or unauthorized party.

Next, in step 508 File Hook 322 detects the attempted access to the plist file. As mentioned above, the operating system detects this access, notes that a callback has been registered for this file, and executes the registered callback in order to notify File Hook 322 of this attempted file access by another process. Any attempted access such as read, write, execute, etc. are detected and File Hook 322 is so notified. Once access is detected, the File Hook may take action depending upon the configuration of antivirus module 312. In one configuration, the user (or designer of the antivirus module) desires that the File Hook shall block access to the plist file immediately without input from the user. This configuration is discussed below in step 512.

In a second configuration, the user (or designer of the antivirus module) desires that the File Hook shall first notify the user and prompt the user for an appropriate action to take. In one embodiment, the File Hook places this access event into a queue. Once an event in the queue has occurred, security service 310 detects this event and uses a function (such as the "ioctl" function to communicate with security kernel 320) to retrieve the event from the queue. The security service makes this event available to antivirus module 312 in user mode which may then prompt the user for an appropriate action.

Figure 7:
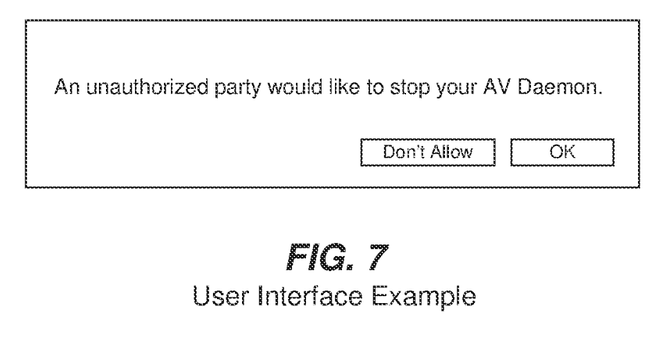
FIG. 7 is a screenshot of a user interface showing a user being prompted to give an instruction when a process attempts to stop the AV daemon.

FIG. 7 is a screenshot showing a prompt for a user. If the user clicks "Don't Allow" then in step 512 below access will be blocked to the plist file. On the other hand, if the user clicks "OK" then the File Hook will return "success" in step 512 below and it is possible that the plist file will be accessed, and that the AV daemon will be unloaded or stopped and anti-virus protection for the computer will end. Assuming that the user provides a response to prevent the AV daemon from being unloaded or stopped, then control moves to step 512.

In step 512 once the attempted file access has been detected, and whether the File Hook is in the first configuration or in the second configuration and the user has provided input, then File Hook 322 blocks the access to the plist file by returning a particular result to the callback function. Once the callback function has been executed in step 508, the operating system expects a return value from File Hook. If the File Hook returns "success" then the access to the plist file will be allowed to occur, while if "false" (specifically, the "EACCES error code") is returned then access to the plist file will be denied. Accordingly, File Hook returns "false" and access to the plist file is blocked. Once access has been blocked, the attacker (or other entity) is unable to stop or unload the AV daemon and in step 516 the AV daemon continues to execute thus providing protection to the host computer according to the functionality of the antivirus module 312.

Figure 6:
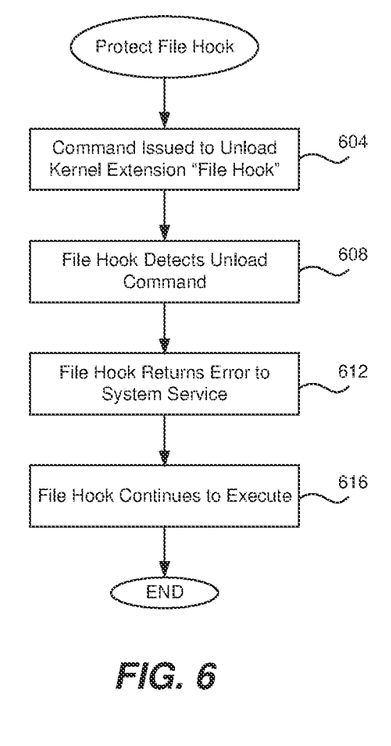
FIG. 6 is a flow diagram describing one embodiment by which the kernel extension File Hook is able to protect itself.

FIG. 6 is a flow diagram describing one embodiment by which the kernel extension File Hook is able to protect itself. As described above in FIG. 4 the kernel extension has been loaded and the AV daemon is executing upon the host computer. In step 604 an attacker (an individual or malicious software) may attempt to unload (or stop) the kernel extension File Hook by invoking a particular command Typically, a kernel extension can be unloaded by invoking the command "kextunload kextID" which will unload a particular kernel extension and terminate its functionality.

In step 608 the kernel extension detects that the unload command has been invoked. In one particular embodiment, the invention makes use of the exit function (specifically, the "module stop routine function") within the kernel extension to check whether this unload command has been authorized by antivirus module 312. As is known in the art, before unloading, a kernel extension will always execute an exit function if available. In this embodiment, the exit function of File Hook will check whether or not the unload command has been invoked from the antivirus module or from another process which is possibly malicious. One specific technique requires that the antivirus module set a particular flag when it invokes the unload command. The exit function will check whether this flag is set or not. If set, then File Hook is allowed to exit and no protection (via this kernel extension) is available for the AV daemon. Another process (such as from a malicious user) will be unaware of this flag and how to set it, and thus if the flag is not set then the exit function will determine that the unload command is not authorized and will not allow File Hook to exit.

More specifically, when a user sends a command to stop the anti-virus module (preferably using the IPC command described below) this flag will be set in memory of the computer, not in persistent storage. When the File Hook extension is restarted, the flag will be reset. When the anti-virus module receives the "stop" command via the protected IPC command, it uses "ioctl" to set this flag for the File Hook extension. This "ioctl" is also protected as is the AV daemon plist file. Only the AV daemon service can use "ioctl" to access the "/dev/tmccfsdev" file (the user mode interface of the File Hook extension) in order to communicate with the File Hook extension. Thus, any attacker or unauthorized process will not only be unaware of the flag, but also will be unable to set the flag.

Accordingly, when the flag is not set, in step 612 then File Hook returns an error to the system service that initially issued the command to unload in step 604, and in step 616 the File Hook kernel extension continues to execute and provide protection for the AV daemon (by blocking access to the plist file as described above with reference to FIG. 5) and the functionality found within antivirus module 312.

If a legitimate customer, individual or application desires to stop antivirus module 312 (for example) from executing, then another technique is provided to send an IPC command to stop the AV daemon. In this situation, the kernel extension File Hook will allow another process to access the AV daemon plist file and unload it or stop it. An explanation of this technique may be found U.S. patent application Ser. No. 15/398,969 entitled "Protection of Interprocess Communications in a Computer" which is hereby incorporated by reference.

Computer System Embodiment

Figure 8A:
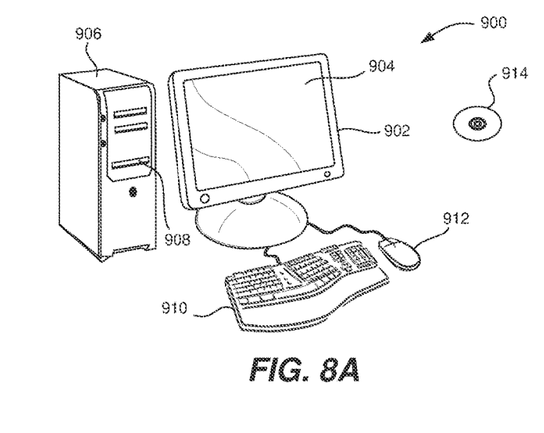
FIGS. 8A and 8B illustrate a computer system suitable for implementing embodiments of the present invention.

FIGS. 8A and 8B illustrate a computer system 900 suitable for implementing embodiments of the present invention. FIG. 8A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

Figure 8B:
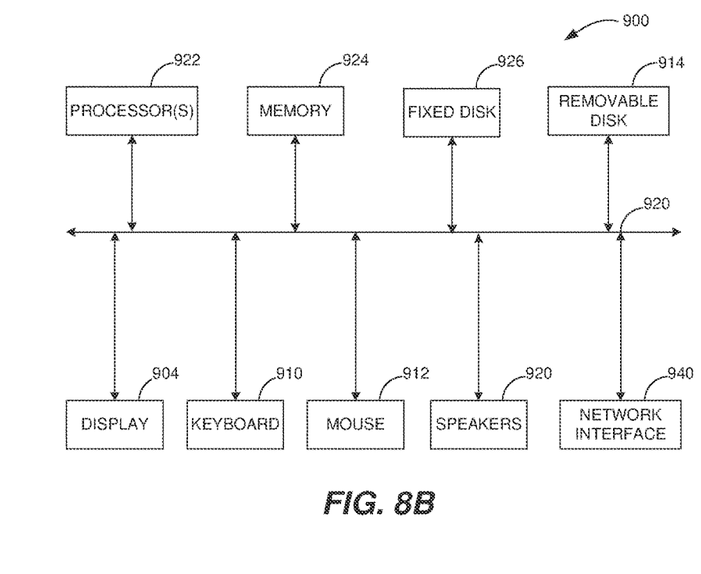

FIG. 8B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of protecting a kernel extension of an operating system of a host computer, said method comprising:

loading, by a daemon executing in said operating system, said kernel extension into kernel mode of said operating system;

receiving a command to unload or to stop said kernel extension invoked by a process executing in said host computer;

in response to said command, executing an exit function of said kernel extension that executes automatically when said kernel extension receives a command to unload or to stop;

determining, by said exit function, that said command was not invoked by said daemon by determining that a flag in memory of said host computer has not been set, said flag able to be set only by said daemon and not able to be set by an unauthorized process;

returning a value from said kernel extension to said operating system indicating that said command is denied; and denying said process to unload or to stop said kernel extension.

2. A method as recited in claim 1 wherein said executing daemon represents an application module in user mode.

3. A method as recited in claim 1 wherein said executing daemon represents an antivirus module of a security service in user mode.

4. A method of protecting a kernel extension of an operating system of a host computer, said method comprising:

loading, by a daemon executing in said operating system, said kernel extension into kernel mode of said operating system;

receiving a command to unload or to stop said kernel extension invoked by a process executing in said host computer;

in response to said command, executing an exit function of said kernel extension that executes automatically when said kernel extension receives a command to unload or to stop;

determining, by said exit function, that said command was invoked by said daemon by determining that a flag in memory of said host computer has been set, said flag able to be set only by said daemon and not able to be set by an unauthorized process;

returning a value from said kernel extension to said operating system indicating that said command is approved; and allowing said process to unload or to stop said kernel extension.

5. A method as recited in claim 4 wherein said executing daemon represents an application module in user mode.

6. A method as recited in claim 4 wherein said executing daemon represents an antivirus module of a security service in user mode.

\* \* \* \* \*